Dec. 11, 1962   R. ASHTON ET AL   3,067,562
HEADER FOR COMBINES
Filed Jan. 25, 1960   4 Sheets-Sheet 1
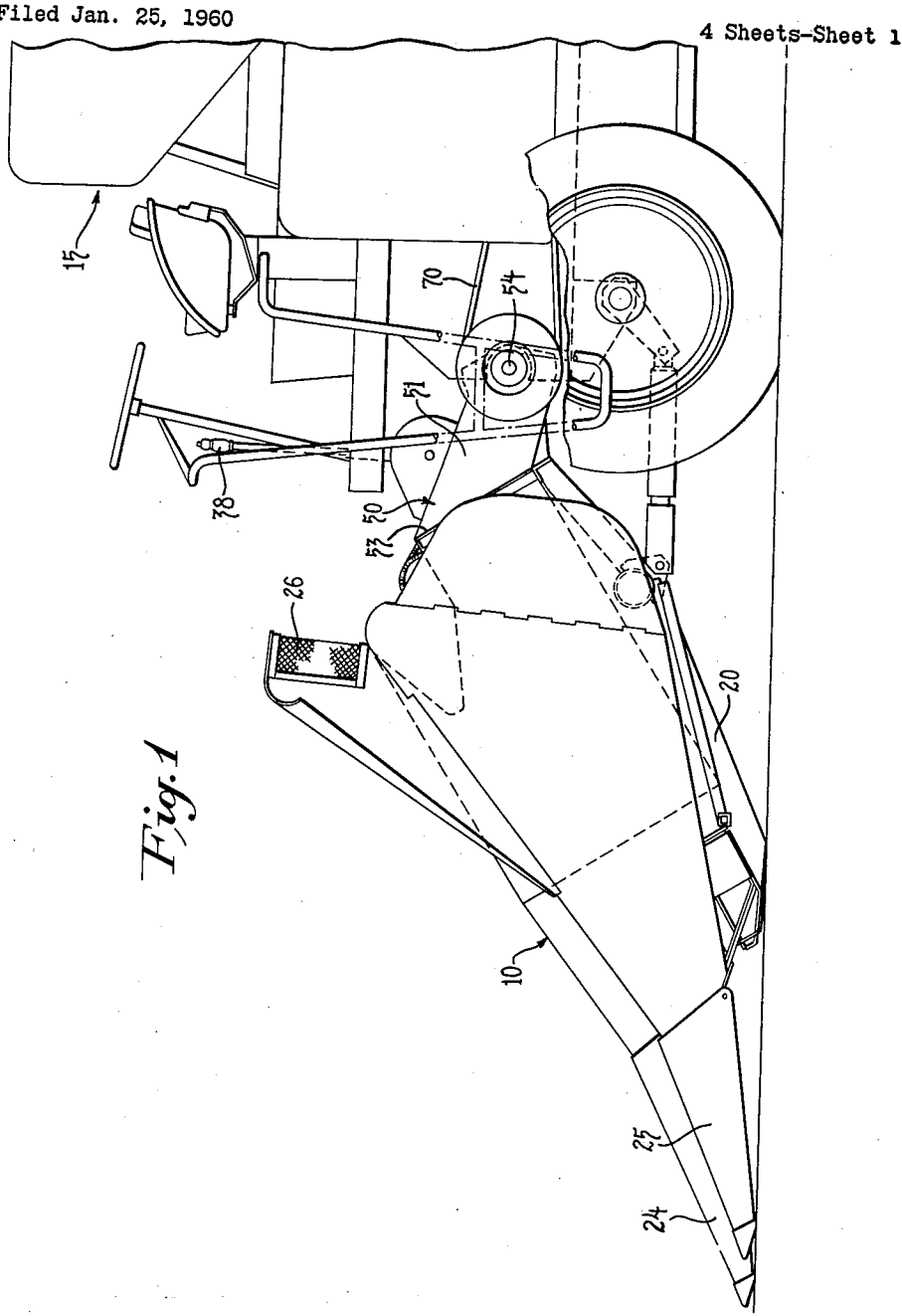
INVENTORS.
ROBERT ASHTON &
BY HORACE CLAIRE SMITH
*Wolf, Hubbard, Voit & Osann*
ATTORNEYS.

Dec. 11, 1962  R. ASHTON ET AL  3,067,562
HEADER FOR COMBINES
Filed Jan. 25, 1960  4 Sheets-Sheet 2
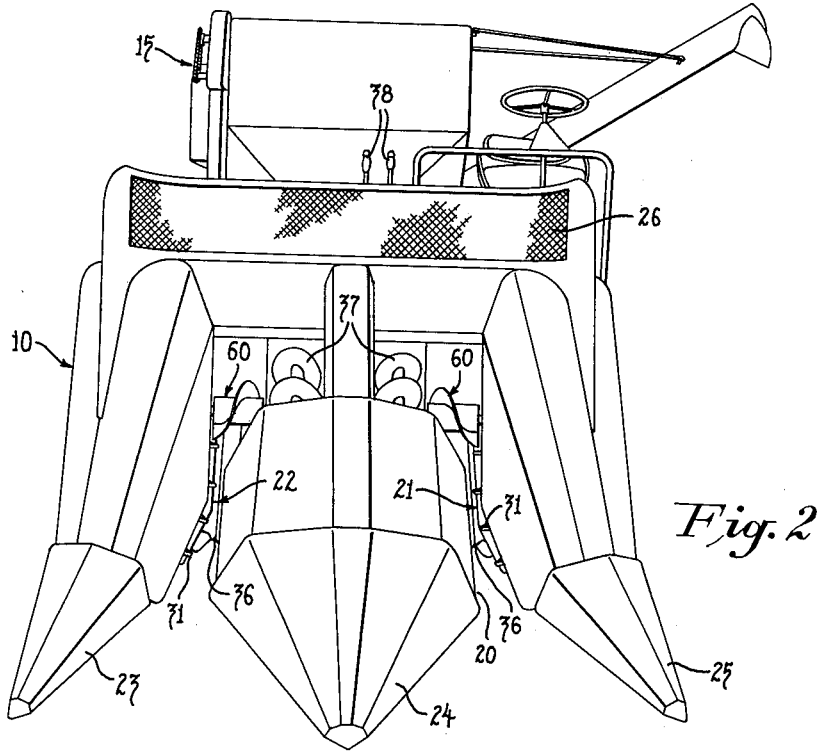
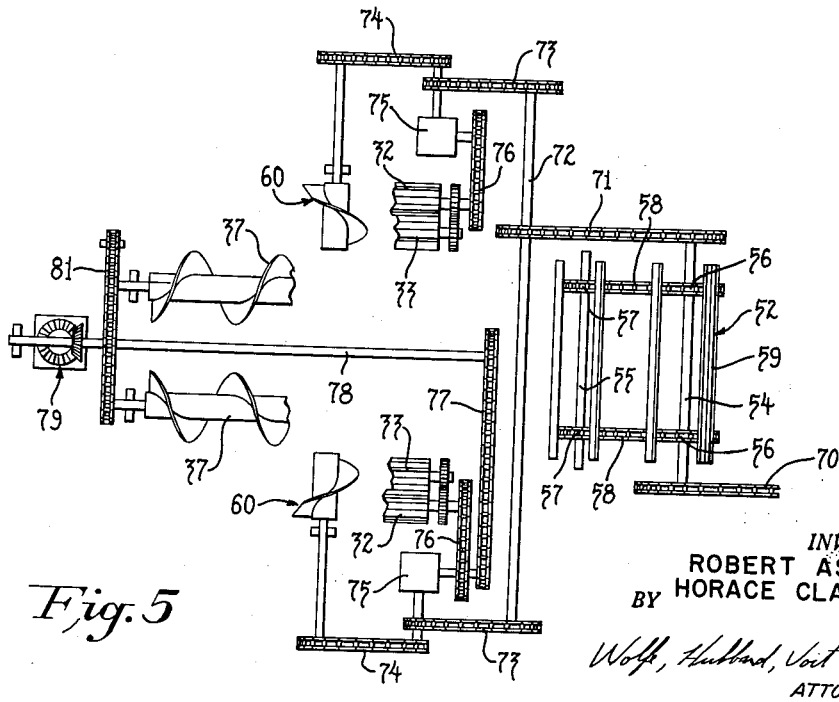
INVENTORS.
ROBERT ASHTON &
BY HORACE CLAIRE SMITH
Wolf, Hubbard, Voit & Osann
ATTORNEYS.

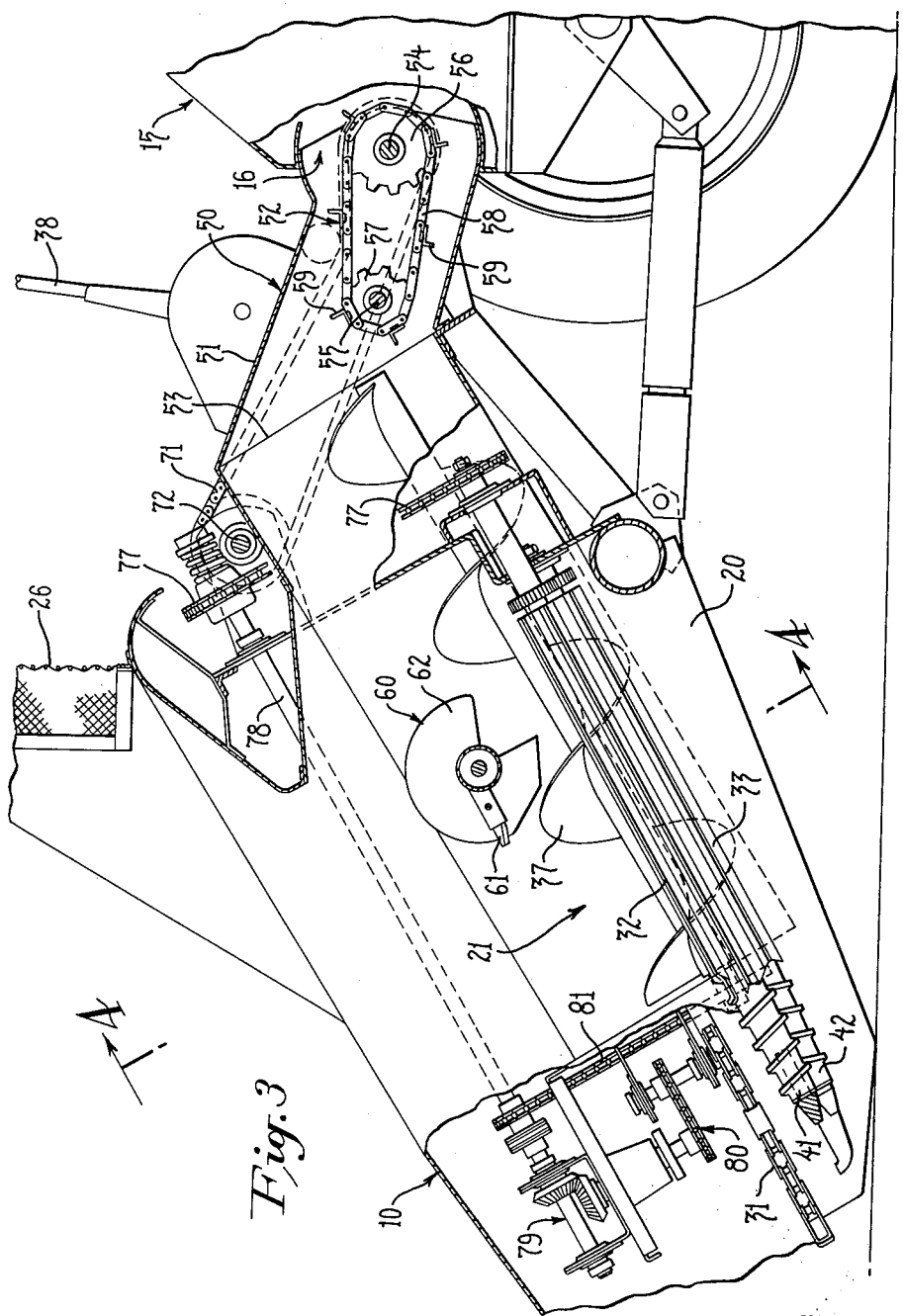

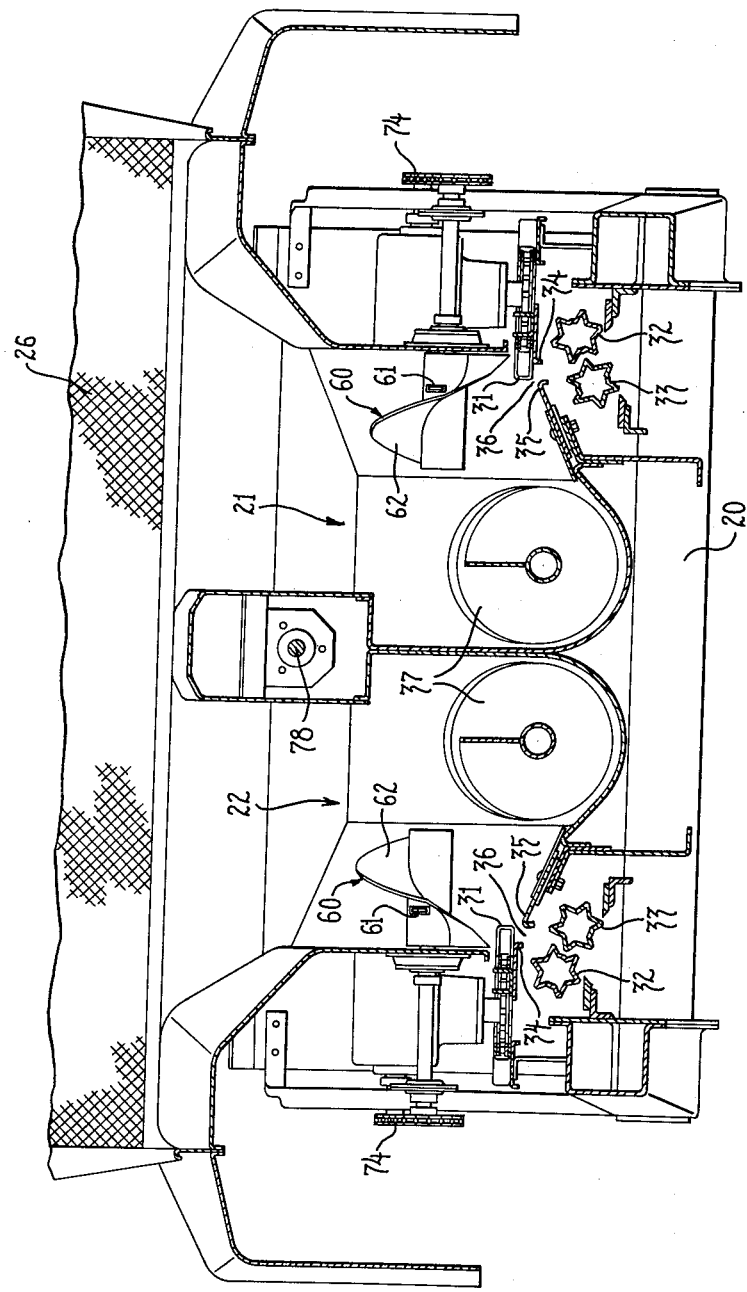

3,067,562
HEADER FOR COMBINES
Robert Ashton, Toronto, Ontario, and Horace Claire Smith, Oakville, Ontario, Canada, assignors to Massey-Ferguson Limited, Toronto, Ontario, Canada
Filed Jan. 25, 1960, Ser. No. 4,509
6 Claims. (Cl. 56—106)

The present invention relates to a crop harvester and concerns more particularly a corn harvesting header attachment for mounting on combines.

A primary object of the invention is to provide a novel corn harvesting attachment, or corn header, for conventional combines which can be readily adapted for use with combines of different sizes and types.

With more particularity, it is an object to provide a corn header of the above type with a secondary crop conveying elevator of simple, economical design for coupling the main header portion to a combine so that easily made changes in the secondary elevator will adapt the header for combines of differing size and form.

It is a further object to provide a corn header as described above in which the secondary crop conveying elevator acts to dispose the harvested ears of corn transversely of the header in proper position to be fed to a combine.

Another important object of the invention is to provide a corn header of the above character that is an effective corn harvester under adverse field conditions where stalks and trash tend to hinder proper delivery of the corn ears to the combine.

In more detail, it is an object to provide, in a corn header as characterized above, cross auger and knife assemblies in which the knives are effective to cut out and break up blockage conditions in the header, and the augers reliably and effectively move the corn ears laterally within the harvester to the delivery augers.

Other objects and advantages of the invention will become apparent upon reading the following detailed description and upon reference to the drawings, in which:

FIGURE 1 is a side elevation of a corn header embodying the invention shown mounted on a conventional combine of which only the forward portion appears and which has parts broken away for clarity;

FIG. 2 is a front elevation of the corn header and combine appearing in FIG. 1;

FIG. 3 is an enlarged, fragmentary, longitudinal section of the corn header attachment shown in FIGS. 1 and 2;

FIG. 4 is a transverse section taken approximately along the line 4—4 of FIG. 3; and FIG. 5 is a diagrammatic representation of the driving train embodied in the corn header of the invention.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning to the drawings, there is shown a corn header or corn harvesting header attachment 10 embodying the invention and mounted on a vehicle 15 which, in the present case, is a conventional combine less its grain header assembly. The corn header 10 thus replaces the usual grain harvesting assembly at the front of the combine 15. The corn header harvests and feeds ears of corn to the combine through a crop intake opening 16 (see FIG. 3) where the harvested ears can be acted upon by corn husking and shelling devices carried within the body of the combine 15.

The corn header illustrated is of the type designed to handle two crop rows and includes a main frame or body portion 20 having duplicate left and right hand crop handling mechanisms 21, 22 respectively. Gathering snouts 23, 24 and 25 are carried on the forward end of the header frame 20 and function to guide the cornstalks toward the crop handling mechanisms 21, 22. A protective screen 26 is mounted at the top of the corn header, and suitable cover plates and panels are formed about the operative mechanisms of the header for styling and protective purposes.

Both the left and right hand crop handling mechanisms 21, 22 are provided at their forward ends with gathering chains 31 which serve to positively propel the cornstalks being harvested back between sets of fluted snapping rolls 32 and 33. Closely overlying the sets of snapping rolls 32, 33 are snapping plates 34 and 35 which define longitudinally extending channels 36 along which the cornstalks pass as they are being acted upon by the snapping rolls 32, 33.

Journaled alongside of the snapping roll and snapping plate assemblies are delivery augers 37 adapted to receive the harvested ears of corn and carry them upwardly and rearwardly toward the combine 15.

In operation, the corn header parts thus far described function in the conventional manner. As the combine propels the corn header 10 along the rows to be harvested, the cornstalks are funneled by the snouts 23, 24, 25 toward the mechanisms 21, 22. The gathering chains 31 engage and propel the stalks back between the snapping rolls 32, 33 and the plates 34, 35, whereupon the snapping rolls act to pull the stalks downwardly through the channels 36. The ears of corn, being wider than the channels 36, are thus snapped from their stalks and the detached ears are carried upwardly and rearwardly by the delivery augers 37.

In the preferred embodiment, the snapping plates 35 are laterally adjustable relative to their cooperating plates 34 so that the operator can select the proper width for the channels 36 to obtain the most effective operation. The plates 35 are adjusted by manipulation of hand levers 38 through suitable linkages which have not been disclosed herein. In the preferred design there are also helical feed portions 41 and 42 provided at the forward ends of the snapping rolls 32, 33 respectively. The feed portions 41, 42 cooperate to assist the gathering chains 31 in drawing the stalks rearwardly between the fluted portions of the snapping rolls.

In accordance with one aspect of the invention, an elevator 50 including a housing 51 containing a conveyor 52 is mounted on the rear of the corn header frame 20 for channeling harvested material from the delivery augers 37 through the crop intake opening 16 of the combine. The elevator 50 joins the body or frame of the header 10 along the line 53 (see FIG. 3) and it can be seen that by simply modifying the elevator 50, the header 10 can be adapted for use with combines of widely differing size and type. Stated in another way, it will be apparent that substantially all of the header structure and operating mechanisms are found in front of the line 53 so that this portion of the header can be considered standard and need not be modified even though headers of this type are manufactured for installation in any number of different types of combines. The relatively simple and inexpensive elevator 50 can be easily modified so that a given corn header will be adapted for proper mounting on any desired type of combine.

The conveyor 52 is preferably a floating chain-and-slat type of undershot conveyor, and therefore includes a fixedly journaled rear shaft 54 and a floating forward shaft 55 which carry, respectively, sprockets 56 and 57 about which chains 58 are trained. As is common with conveyors of this type, two or more sprocket pairs and chains are provided and pusher slats 59 are secured transversely across the chains.

It can be readily understood that the transverse pushers 59 of the conveyor 52 act to transversely aline the ears of corn with respect to their direction of movement. The corn ears thus move sideways into the combine 15 so as to minimize cob crushing in the husking and shelling devices. By virtue of the transverse alinement of the ears, substantially the full width of the opening 16 is utilized to take in the harvested ears of corn and thus the full width of the husking and shelling apparatus within the combine is employed to work on the harvested material.

In accordance with a further aspect of the invention, cross augers 60 are journaled on the header 10 so that their flights 62 extend transversely above each set of snapping rolls 32, 33, and a radially disposed knife 61 is mounted on each auger to extend beyond the periphery of the auger flights 62. Upon rotation of the auger 60, the knives 61 cut through and break up crop material tending to block the channels 36 while the flights 62 of the cross augers positively urge the harvested, detached ears of corn laterally from the snapping rolls to the delivery augers 37. Because of the cooperation of the augers 60 and the knives 61 carried thereby, the corn header 10 is able to effectively operate under adverse field conditions where cornstalks and trash tend to jam the mechanisms 21, 22. The knives 61 cut through material tending to create blockage conditions while the auger flights clear the harvested ears of corn from the corn ear detaching mechanisms.

In order to drive the various rotatable devices of the corn header 10, positive shaft and chain connections are provided from a driving sprocket on the combine 15. In the illustrated embodiment, these connections include, as can be best seen in FIG. 5, a main driving chain 70 which drives the shaft 54 and thus powers the conveyor 52. A chain 71 couples the shaft 54 to a cross shaft 72, and the cross shaft drives chains 73 and 74 to power the cross augers 60. The chains 73, through bevel gear boxes 75 and chains 76, also supply power to the snapping rolls 32, 33.

For driving the gathering chains 31 and the delivery augers 37, a chain 77 is extended from one of the bevel gear boxes 75 to a longitudinal shaft 78 which drives the gathering chains 31 through bevel gearing 79 and appropriate chain and sprocket connections 80 (see FIG. 3). The shaft 78 also carries a sprocket driving a chain 81 which couples the shaft 78 to the delivery augers 37. It can thus be seen that power supplied from the combine 15 through the chain 70 is efficiently supplied through positive driving connections to each of the rotatable mechanisms of the corn header 10.

We claim as our invention:

1. A corn harvester comprising, in combination, a frame, corn stalk gathering snouts on the forward end of said frame, means including longitudinally extending snapping rolls disposed on said frame behind said snouts for detaching corn ears from the gathered stalks, a delivery auger journaled on said frame alongside of said snapping rolls so as to receive and carry the detached ears of corn back along said frame, a cross auger journaled on said frame so as to extend transversely above said rolls, and a radially disposed knife mounted on said cross auger at a point above said rolls, said knife extending beyond the periphery of said cross auger so that upon rotation of the cross auger said knife can cut through and break up crop material tending to block said attachment while the cross auger moves harvested crop material laterally from said rolls to said delivery auger.

2. A corn harvester comprising, in combination, a frame, corn stalk gathering snouts on the forward end of said frame, means defining a longitudinally extending channel on said frame along which cornstalks are conveyed from said snout, means for conveying stalks along said channel and for stripping ears of corn from the stalks, a delivery auger journaled on said frame alongside of said channel so as to receive and carry the detached ears of corn back along said frame, a cross auger journaled on said frame so as to extend transversely above said channel, and a radially disposed knife mounted on said cross auger at a point above said channel, said knife extending beyond the periphery of said cross auger so that upon rotation of the cross auger said knife can cut through and break up crop material tending to block said attachment while the cross auger moves harvested crop material laterally from said channel to said delivery auger.

3. In a corn harvester having a channel along which cornstalks are moved and stripped of their ears and an adjacent delivery conveyor for the ears of corn, the improvement comprising, in combination, a cross auger disposed transversely above said channel so that, upon rotation, the auger moves ears of corn from said channel to said conveyor, and a radially disposed knife mounted on said auger directly above said channel, said knife being extended beyond the periphery of said auger so as to be effective for breaking up blockage in said channel upon rotation of said auger.

4. A corn harvester comprising, in combination, a frame, a corn picking and conveying device mounted on said frame and having a corn discharge end, a corn treating device having a crop intake opening, and an elevator on said frame interconnecting said picking and conveying device and said treating device, said elevator including a tubular housing connected to said picking and conveying device at said end and having an articulate connection to said treating device with said housing interfitting with said intake housing, said housing having therein a conveyor for moving corn from said picking and conveying device to said treating device.

5. An attachment as defined in claim 4 in which said corn picking and conveying device comprises, in combination, cornstalk gathering snouts on the forward end of said frame, means including longitudinally extending snapping rolls disposed on said frame behind said snouts for detaching corn ears from the gathered stalks, and a delivery auger journaled on said frame alongside of said snapping rolls so as to receive and carry the detached ears of corn back along said frame to said discharge end.

6. An attachment as defined in claim 4 in which said conveyor comprises a floating, chain-and-slat type of undershot conveyor for propelling harvested ears of corn from the attachment to said treating device while urging the ears into transverse relation with respect to their direction of movement.

References Cited in the file of this patent

UNITED STATES PATENTS

| | | |
|---|---|---|
| 2,527,802 | Dwyer | Oct. 31, 1950 |
| 2,571,865 | Greedy et al. | Oct. 16, 1951 |
| 2,700,858 | Bulfer | Feb. 1, 1955 |

UNITED STATES PATENT OFFICE
CERTIFICATE OF CORRECTION

Patent No. 3,067,562                                                    December 11, 1962

Robert Ashton et al.

It is hereby certified that error appears in the above numbered patent requiring correction and that the said Letters Patent should read as corrected below.

Column 4, line 43, for "said intake housing" read -- said intake opening --.

Signed and sealed this 23rd day of July 1963.

(SEAL)
Attest:

ERNEST W. SWIDER                                          DAVID L. LADD
Attesting Officer                                          Commissioner of Patents